(12) United States Patent
Hirose (10) Patent No.: US 6,545,817 B2
(45) Date of Patent: Apr. 8, 2003

(54) ZOOM LENS SYSTEM

(75) Inventor: Masatoshi Hirose, Sakurai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/965,087

(22) Filed: Sep. 27, 2001

(65) Prior Publication Data

US 2002/0089761 A1 Jul. 11, 2002

(30) Foreign Application Priority Data

Sep. 27, 2000 (JP) ........................................ 2000-293342
Sep. 27, 2000 (JP) ........................................ 2000-293343

(51) Int. Cl.[7] ............................................. G02B 15/14
(52) U.S. Cl. .................... 359/683; 359/676; 359/684; 359/739; 359/740; 359/649
(58) Field of Search ........................ 359/776, 782–783, 359/684, 739, 740, 649, 695, 676–683

(56) References Cited

U.S. PATENT DOCUMENTS 5,668,668 A * 9/1997 Shibayama et al. ......... 359/683
6,008,952 A * 12/1999 Yamamoto .................. 359/683
6,222,680 B1 * 4/2001 Yamamoto et al. ......... 359/680

FOREIGN PATENT DOCUMENTS

JP   11-202200 A   7/1999

* cited by examiner

Primary Examiner—Georgia Epps
Assistant Examiner—M. Hasan
(74) Attorney, Agent, or Firm—Sidley Austin Brown & Wood LLP

(57) ABSTRACT

A zoom lens system has, sequentially from enlarging side to reducing side, first lens unit having negative optical power; second lens unit having positive optical power, the second lens unit having a positive lens element positioned nearest the reducing side; diaphragm; third lens unit having positive optical power, the third lens unit comprising, sequentially from enlarging side to reducing side, a cemented lens unit having a positive lens element and a negative lens element with a concave surface facing the reducing side, and a positive lens element having a concave surface facing the reducing side; fourth lens unit having negative optical power; and fifth lens unit having positive optical power. The second, third, and fourth lens units move from enlarging side to reducing side when zooming from telephoto end to wide angle end. The zoom lens system satisfies a predetermined condition.

12 Claims, 7 Drawing Sheets

FIG. 4A
FNO=2.33
(T)
— d
— · — g
— ·· — c
— — — SC
−0.2   0.2
SPHERICAL ABERRATION
AND SINE CONDITION

FIG. 4B
Y'=13.1
(T)
— — — DM
——— DS
−0.2   0.2
ASTIGMATISM

FIG. 4C
Y'=13.1
(T)
−2.0   2.0
% DISTORTION

FIG. 4D
FNO=2.15
(W)
— d
— · — g
— ·· — c
— — — SC
−0.2   0.2
SPHERICAL ABERRATION
AND SINE CONDITION

FIG. 4E
Y'=13.1
(W)
— — — DM
——— DS
−0.2   0.2
ASTIGMATISM

FIG. 4F
Y'=13.1
(W)
−2.0   2.0
% DISTORTION

FIG. 5A
FNO=2.49
(T)
— d
— · — g
— ·· — c
— — — SC
−0.2   0.2
SPHERICAL ABERRATION
AND SINE CONDITION

FIG. 5B
Y'=13.1
(T)
— — — DM
——— DS
−0.2   0.2
ASTIGMATISM

FIG. 5C
Y'=13.1
(T)
−2.0   2.0
% DISTORTION

FIG. 11D
FNO=2.15
(W)
—— d
—··— g
—···— c
———— SC
-0.2    0.2
SPHERICAL ABERRATION
AND SINE CONDITION

FIG. 11E
Y'=13.1
(W)
———— DM
——— DS
-0.2    0.2
ASTIGMATISM

FIG. 11F
Y'=3.1
(W)
-2.0    2.0
% DISTORTION

FIG. 12A
FNO=2.38
(T)
—— d
—··— g
—···— c
———— SC
-0.2    0.2
SPHERICAL ABERRATION
AND SINE CONDITION

FIG. 12B
Y'=13.1
(T)
———— DM
——— DS
-0.2    0.2
ASTIGMATISM

FIG. 12C
Y'=13.1
(T)
-2.0    2.0
% DISTORTION

FIG. 12D
FNO=2.15
(T)
—— d
—··— g
—···— c
———— SC
-0.2    0.2
SPHERICAL ABERRATION
AND SINE CONDITION

FIG. 12E
Y'=13.1
(T)
———— DM
——— DS
-0.2    0.2
ASTIGMATISM

FIG. 12F
Y'=3.1
(T)
-2.0    2.0
% DISTORTION

ZOOM LENS SYSTEM

RELATED APPLICATIONS

This application is based on Patent Application Nos. 2000-293342 and 2000-293343 filed in Japan, the contents of which are hereby incorporated by reference.

BACKGROUND OF THE INVENTION

1. Field of the Invention

The present invention relates to a projection zoom lens, for example, a projection zoom lens suitable for use as a projection optical system in a projection device (e.g., a liquid crystal projector for projecting an image on a liquid crystal panel onto a screen or the like).

2. Description of the Related Art

Various types of projection zoom lens have been proposed, the mainstream being a projection zoom lens for a liquid crystal projector having a half field angle of 20° front and back (Japanese Laid-Open Patent No. 11-202200).

If the field angle of the projection zoom lens is wider, a display image can be projected larger at a shorter projection distance. For this reason there is commercial demand for a projection zoom lens of the wide field angle type having a half field angle of 35° or greater. However, when the field angle is widened, it becomes difficult to correct aberration such as curvature of field.

SUMMARY

An object of the present invention is to provide an improved zoom lens.

Another object of the present invention is to provide a wide angle type projection zoom lens having excellent optical performance.

These objects are attained by a zoom lens system comprising, sequentially from the enlarging side to the reducing side, a first lens unit having negative optical power; a second lens unit having positive optical power, the second lens unit having a positive lens element positioned nearest the reducing side; a diaphragm; a third lens unit having positive optical power, the third lens unit comprising, sequentially from the enlarging side to the reducing side, a cemented lens unit having a positive lens element and a negative lens element with a concave surface facing the reducing side, and a positive lens element having a concave surface facing the reducing side; a fourth lens unit having negative optical power; and a fifth lens unit having positive optical power; wherein the second lens unit, the third lens unit, and the fourth lens unit move from the enlarging side to the reducing side when zooming from the telephoto end to the wide angle end, and wherein the zoom lens system satisfies the condition below:

$$-1.5 < (fw/r2A) + (fw/r3A) < -0.05$$

where fw represents the focal length of the entire system at the wide angle end, r2A represents the radius of curvature of the surface on the enlarging side of the lens element positioned nearest the reducing side of the second lens unit, and r3A represents the radius of curvature of the surface nearest the enlarging side of the third lens unit.

These objects are further attained by a zoom lens system comprising, sequentially from the enlarging side to the reducing side, a first lens unit having negative optical power; a second lens unit having positive optical power, the second lens unit having a positive lens element positioned nearest the reducing side; a diaphragm; a third lens unit having positive optical power, the third lens unit comprising, sequentially from the enlarging side to the reducing side, a cemented lens unit having a positive lens element and a negative lens element with a concave surface facing the reducing side, and a positive lens unit having a concave surface facing the reducing side; a fourth lens unit having negative optical power; and a fifth lens unit having positive optical power; wherein the second lens unit and the third lens unit move from the enlarging side to the reducing side when zooming from the telephoto end to the wide angle end, and the fourth lens unit does not move during zooming, wherein the zoom lens system satisfies the condition below:

$$-1.5 < (fw/r2A) + (fw/r3A) < -0.05$$

where fw represents the focal length of the entire system at the wide angle end, r2A represents the radius of curvature of the surface on the enlarging side of the lens element positioned nearest the reducing side of the second lens unit, and r3A represents the radius of curvature of the surface nearest the enlarging side of the third lens unit.

These objects are further attained by a zoom lens system comprising, sequentially from the enlarging side to reducing side, a first lens unit having negative optical power; a second lens unit having positive optical power, the second lens unit comprising, sequentially from the enlarging side to the reducing side, a positive lens element having a concave surface facing the enlarging side, and a negative meniscus lens element having a concave surface facing the enlarging side, a third lens unit having positive optical power; a fourth lens unit having negative optical power; and a fifth lens unit having positive optical power; wherein the second lens unit, third lens unit, and fourth lens unit move from the enlarging side to the reducing side when zooming from the telephoto end to the wide angle end, and wherein the zoom lens system satisfies the conditions below:

$$3.5 < f2/fw < 7.0$$

$$0.05 < (r2F - r2R)/(r2F + r2R) < 0.45$$

where fw represents the focal length of the entire system at the wide angle end, f2 represents the focal length of the second lens unit, r2F represents the radius of curvature of the surface on the enlarging side of the negative meniscus lens element of the second lens unit, and r2R represents the radius of curvature of the surface on the reducing side of the negative meniscus lens element of the second lens unit.

These objects are attained by a zoom lens system comprising, sequentially from the enlarging side to the reducing side, a first lens unit having negative optical power, a second lens unit having positive optical power, the second lens unit comprising, sequentially from the enlarging side to the reducing side, a positive lens element having a concave surface facing the enlarging side, and a negative meniscus lens element having a concave surface facing the enlarging side; a third lens unit having positive optical power; a fourth lens unit having negative optical power; and a fifth lens unit having positive optical power; wherein the second lens unit and third lens unit move from the enlarging side to the reducing side when zooming from the telephoto end to the wide angle end, and the fourth lens unit does not move during zooming, and wherein the zoom lens system satisfies the conditions below:

$$3.5 < f2/fw < 7.0$$

$$0.05 < (r2F - r2R)/(r2F + r2R) < 0.45$$

where fw represents the focal length of the entire system at the wide angle end, f2 represents the focal length of the second lens unit, r2F represents the radius of curvature of the surface on the enlarging side of the negative meniscus lens element of the second lens unit, and r2R represents the radius of curvature of the surface on the reducing side of the negative meniscus lens element of the second lens unit.

BRIEF DESCRIPTION OF THE DRAWINGS

These and other objects and features of this invention will become clear from the following description, taken in conjunction with the preferred embodiments, with reference to the accompanying drawings, in which.

DESCRIPTION OF THE PREFERRED EMBODIMENTS

The projection lens system of the present invention is described hereinafter with reference to the accompanying drawings. Although the mode of the embodiments described below is a zoom lens suitable as a projection optical system in a projection device (e.g., liquid crystal projector), the invention is also obviously suitable as a projection optical system in an image sensing device (e.g., video camera, digital camera).

Figure 1:
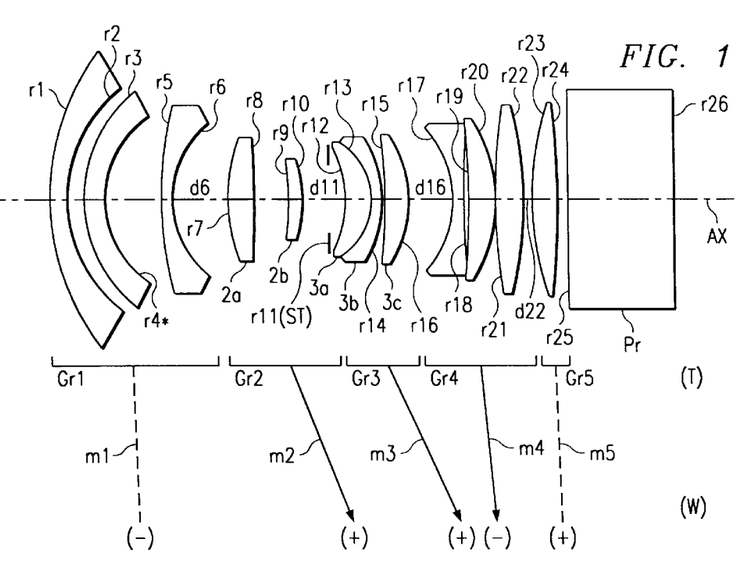
FIG. 1 is a structural view of the lens of a first embodiment (example 1)
Figure 2:
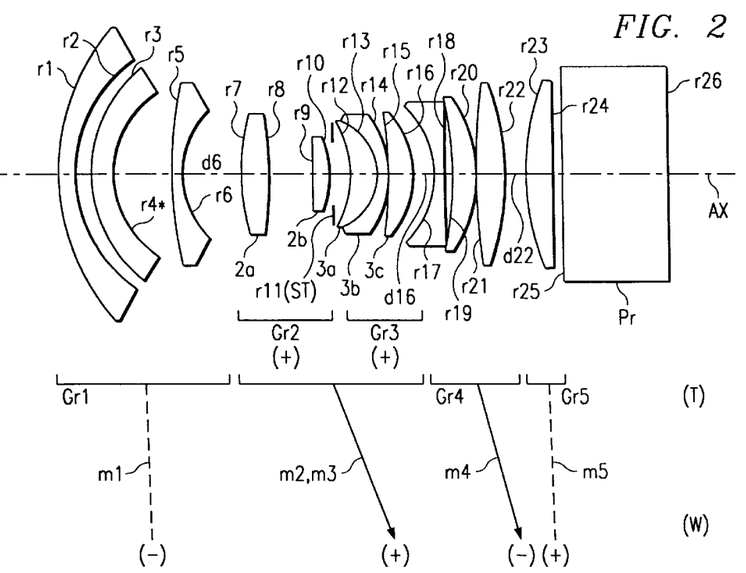
FIG. 2 is a structural view of the lens of a second embodiment (example 2)
Figure 3:
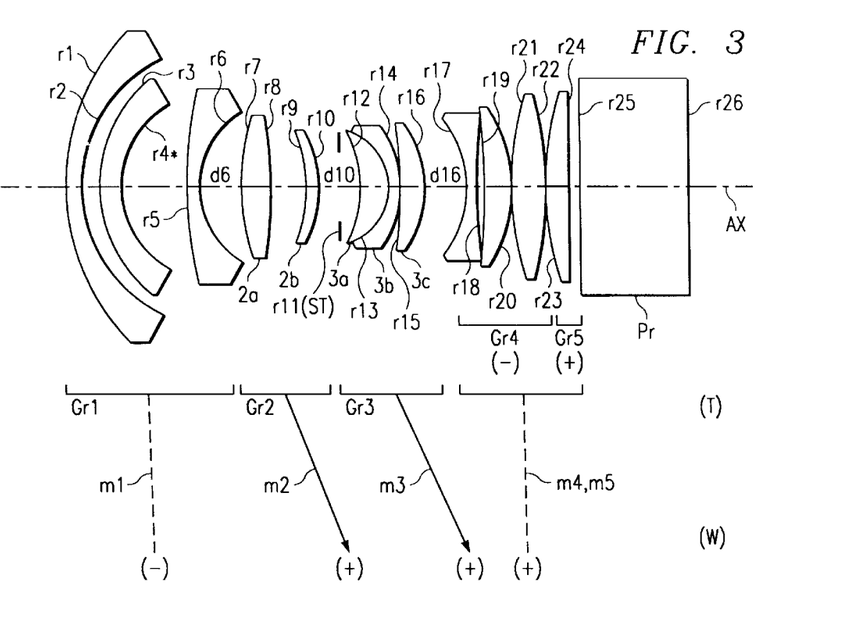
FIG. 3 is a structural view of the lens of a third embodiment (example 3)
Figure 4A:
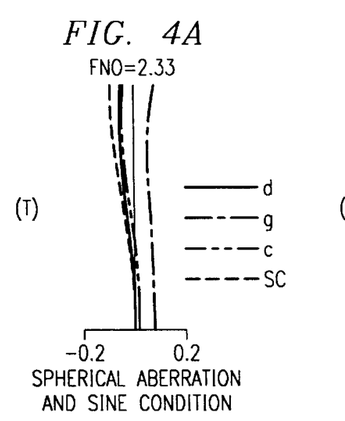
FIGS. 4A–4F are aberration diagrams of the zoom lens system of the first embodiment.
Figure 4B:
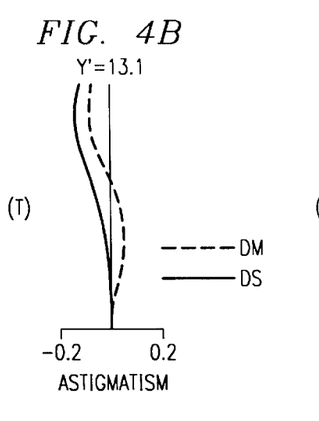
Figure 4C:
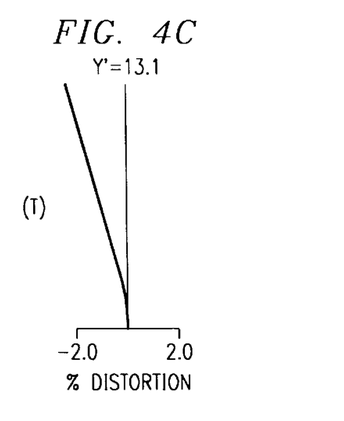
Figure 4D:
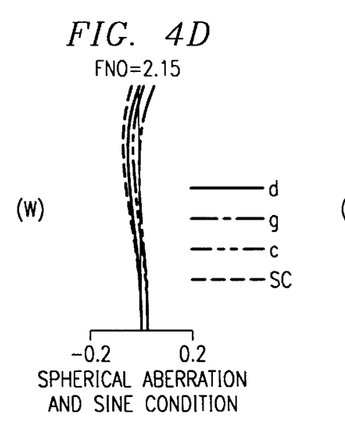
Figure 4E:
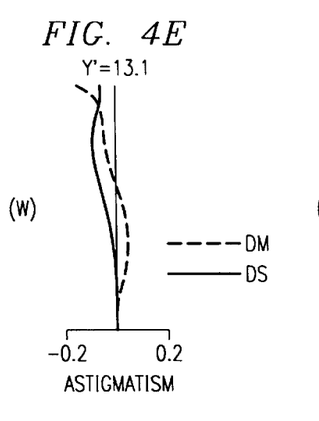
Figure 4F:
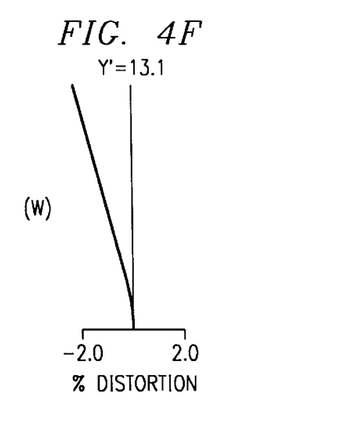
Figure 5A:
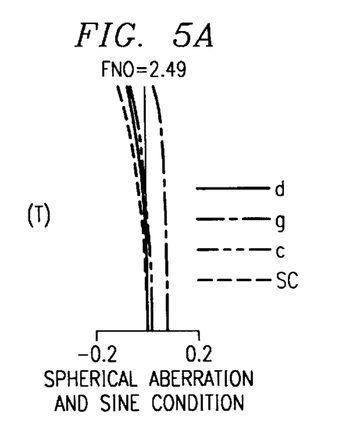
FIGS. 5A–5F are aberration diagrams of the zoom lens system of the second embodiment.
Figure 5B:
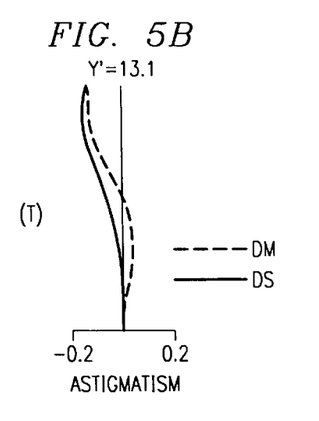
Figure 5C:
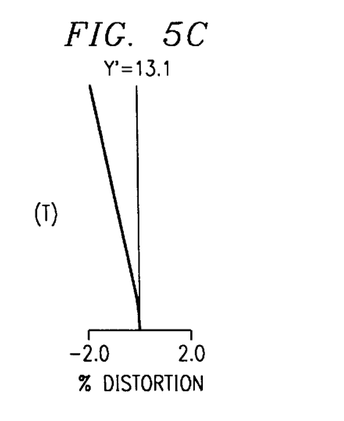
Figure 5D:
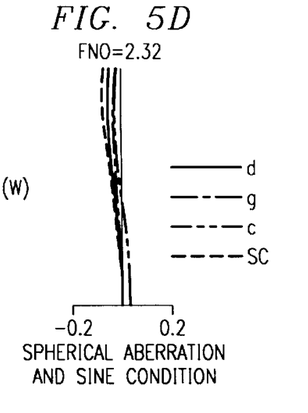
Figure 5E:
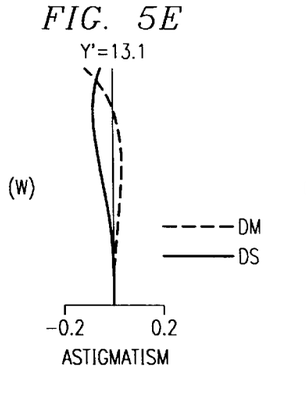
Figure 5F:
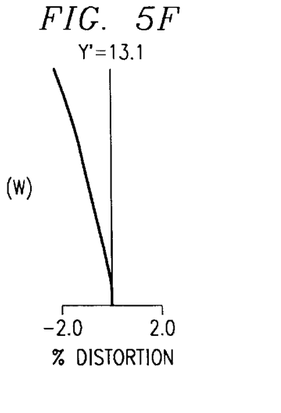
Figure 6A:
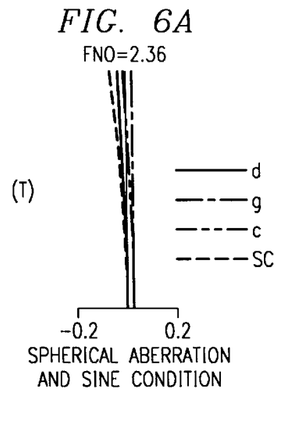
FIGS. 6A–6F are aberration diagrams of the zoom lens system of the third embodiment.
Figure 6B:
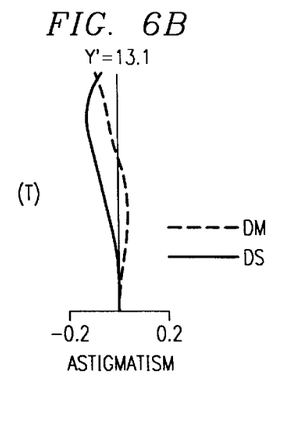
Figure 6C:
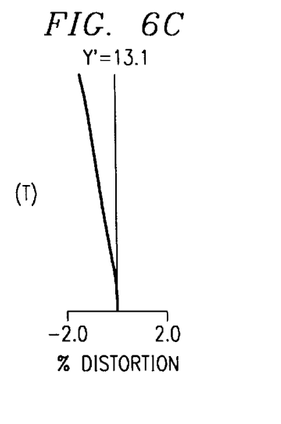
Figure 6D:
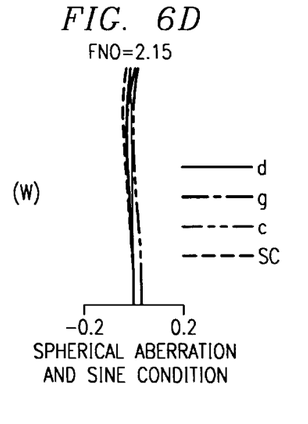
Figure 6E:
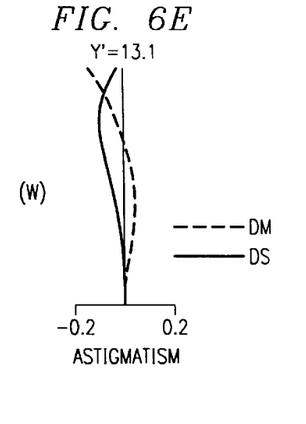
Figure 6F:
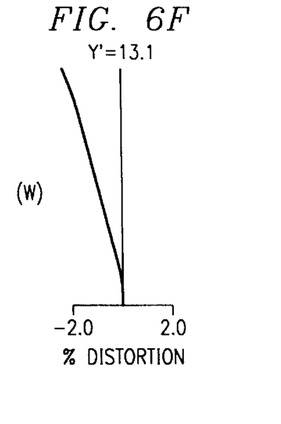

FIGS. 1–3 show lens structures respectively corresponding to the zoom lenses of the first through third embodiments, wherein the lens layout is shown in optical section at the telephoto end (T). In each lens structure drawing, the solid arrows mj(j=2, 3, 4) schematically show the movement along the optical axis (AX) of the No. j lens unit (Grj) when zooming from the telephoto end (longest focal length end; T) to the wide angle end (shortest focal length end; W), and the dashed lines mj (j=1, 4, 5) represent a fixed position of the No. j lens unit (Grj) during zooming. In each lens structural drawing, surfaces marked by the symbol ri (i=1, 2, 3, . . . ) are the No. i surface counting from the enlarging side (i.e., projection side), and surfaces marked by ri with an asterisk symbol (*) are aspherical surfaces. The axial distance marked by the symbol di is a variable distance which changes during zooming among the No. i axial distances di (i=1, 2, 3, . . . ) counting from the enlarging side.

The first through third embodiments are projection zoom lenses which are approximately telecentric on the reducing side and comprise, sequentially from the enlarging side, a first lens unit (Gr1) having negative optical power, a second lens unit (Gr2) having positive optical.power, a third lens unit (Gr3) having positive optical power, a fourth lens unit (Gr4) having negative optical power, and a fifth lens unit (Gr5) having positive optical power. A diaphragm (ST) is disposed medially to the second lens unit (Gr2) and the third lens unit (Gr3); and on the reducing side of the fifth lens unit (Gr5) is disposed a prism (Pr) equivalent to a cross dichroic prism, flux separation prism or the like. Near the exit surface of the prism (Pr) is disposed a display element (liquid crystal panel or the like) for displaying an image to be projected onto a screen.

In the first embodiment (FIG. 1), when zooming from the telephoto end (T) to the wide angle end (W), the second lens unit (Gr2), third lens unit (Gr3), and fourth lens unit (Gr4) move from the enlarging side to the reducing side. During this zooming the diaphragm (ST), disposed medially to the second lens unit (Gr2) and the third lens unit (Gr3), moves together with the second lens unit (Gr2) in the zoom movement; the distance (d6) between the first lens unit (Gr1) and the second lens unit (Gr2), and the distance (d11) between the second lens unit (Gr2) and the third lens unit (Gr3) are increased; and the distance (d16) between the third lens unit (Gr3) and the fourth lens unit (Gr4), and the distance (d22) between the fourth lens unit (Gr4) and the fifth lens unit (Gr5) are reduced. The first lens unit (Gr1), fifth lens unit (Gr5), and prism (Pr) are stationary during zooming.

In the second embodiment (FIG. 2), when zooming from the telephoto end (T) to the wide angle end (W), the second lens unit (Gr2), third lens unit (Gr3), and fourth lens unit (Gr4) move from the enlarging side to the reducing side. During this zooming the diaphragm (ST), disposed medially to the second lens unit (Gr2) and the third lens unit (Gr3), moves together with the second lens unit (Gr2) and the third lens unit (Gr3) in the zoom movement; the distance (d6) between the first lens unit (Gr1) and the second lens unit (Gr2) is increased; and the distance (d16) between the third lens unit (Gr3) and the fourth lens unit (Gr4), and the distance (d22) between the fourth lens unit (Gr4) and the fifth lens unit (GrS) are reduced. Since the second lens unit (Gr2) and the third lens unit (Gr3) perform the same movement during zooming, this zoom lens is of a type which maintains the negative-positive-positive-negative-positive optical power arrangement, and functions as a four-part negative-positive-negative-positive zoom. Furthermore, the first lens unit (Gr1), fifth lens unit (Gr5), and prism (Pr) are stationary during zooming.

In the third embodiment (FIG. 3), when zooming from the telephoto end (T) to the wide angle end (W), the second lens unit (Gr2) and third lens unit (Gr3) move from the enlarging side to the reducing side. During this zooming the diaphragm (ST), disposed medially to the second lens unit (Gr2) and the third lens unit (Gr3), moves together with the third lens unit (Gr3) in the zoom movement; the distance (d6) between the first lens unit (Gr1) and the second lens unit (Gr2), and the distance (d10) between the second lens unit (Gr2) and the third lens unit (Gr3) are increased; and the distance (d16) between the third lens unit (Gr3) and the fourth lens unit (Gr4) is reduced. Since the fourth lens unit (Gr4) does not move during zooming, the first lens unit (Gr1), fourth lens unit (Gr4), fifth lens unit (Gr5), and prism (Pr) are stationary during zooming. Accordingly, this zoom lens is of a type which maintains the negative-positivepositive-negative-positive optical power arrangement, and functions as a four-part negative-positive-positive-positive zoom.

In the first embodiment (FIG. 1), each lens unit is constructed, sequentially from the enlarging side, as described below. The first lens unit (Gr1) is a three-part negative meniscus lens having a concave surface facing the reducing side, and the No. 4 surface (r4) counting from the enlarging side is an aspherical surface, The lens unit (Gr2) comprises a biconvex positive lens element (2a), and a positive meniscus lens element (2b) having a convex surface facing the reducing side. The third lens unit (Gr3) has a cemented lens comprising a positive meniscus lens element (3a) having a convex surface facing the reducing side and a negative meniscus lens element (3b) having a convex surface on the reducing side, and also has a positive meniscus lens element (3c) having a convex surface facing the reducing side. The fourth lens unit (Gr4) comprises a biconcave negative lens element, a positive meniscus lens element having a convex surface facing the reducing side, and a biconvex positive lens element. The fifth lens unit (Gr5) comprises a biconvex positive lens element.

In the second and third embodiments (FIGS. 2 and 3), each lens unit is constructed, sequentially from the enlarging side, as described below. The first lens unit (Gr1) is a three-part negative meniscus lens having a concave, surface facing the reducing side, and the No. 4 surface (r4) counting from the enlarging side is an aspherical surface. The lens unit (Gr2) comprises a biconvex positive lens element (2a), and a positive meniscus lens element (2b) having a convex surface facing the reducing side. The third lens unit (Gr3) has a cemented lens comprising a positive meniscus lens element (3a) having a convex surface facing the reducing side and a negative meniscus lens element (3b) having a convex surface on the reducing side, and also has a positive meniscus lens element (3c) having a convex surface facing the reducing side. The fourth lens unit (Gr4) comprises a biconcave negative lens element, positive meniscus lens element having a convex surface facing the reducing side, and a biconvex positive lens element. The fifth lens unit (Gr5). comprises a piano-convex positive lens element having a convex surface facing the enlarging side.

It is desirable from the perspective of aberration correction that the first lens unit (Gr1) has at least one surface that is an aspherical surface, as in the first through third embodiments. The lens diameter of the first lens unit (Gr1) can be reduced when the first lens unit (Gr1) having negative optical power is stationary during zooming. For example, the mechanical structure of the first lens unit (Gr1) becomes simpler and compact in the diameter direction even when using a focusing method of extending one lens unit. Accordingly, a zoom lens which is more compact overall in the diameter direction is obtained.

In the first through third embodiments, the lens element (2b) positioned nearest the reduction side in the second lens unit (Gr2) is a positive lens, and the third lens unit (Gr3) has, sequentially from the enlarging side, a cemented lens comprising a positive lens element (3a) and a negative lens element (3b) having a convex surface on the reducing side, and also has a positive lens element (3c) having a convex surface facing the reducing side. In a lens type having an optical power arrangement of negative-positive-positive-negative-positive, it is desirable that the second lens unit (Gr2) and the third lens unit (Gr3) have the structures described above and satisfy condition (1) below, and it is particularly desirable that condition (1A) is satisfied.

$$-1.5 < fw/r2A + (fw/r3A) < -0.05 \quad (1)$$

$$-1.1 < fw/r2A + (fw/r3A) < -0.05 \quad (1A)$$

where fw represents the focal length of the entire system at the wide angle end, r2A represents the radius of curvature of the surface on the enlarging side of lens element (2b) positioned on the reducing side of the second lens unit (Gr2) (r9 in FIGS. 1–3), and r3A represents the radius of curvature of the surface nearest the enlarging side of the third lens unit (Gr3) (r12 in FIGS. 1–3).

When the lower limit of condition (1) is exceeded, distortion worsens, and conversely when the upper limit of condition (1) is exceeded, curvature of field and astigmatic difference worsen. Accordingly, curvature of field and astigmatic difference, which become problems at wide angle, can be suitably corrected by satisfying condition (1), and preferably satisfying condition (1A), such that a wide angle type projection zoom lens having excellent optical performance can be realized.

Figure 7:
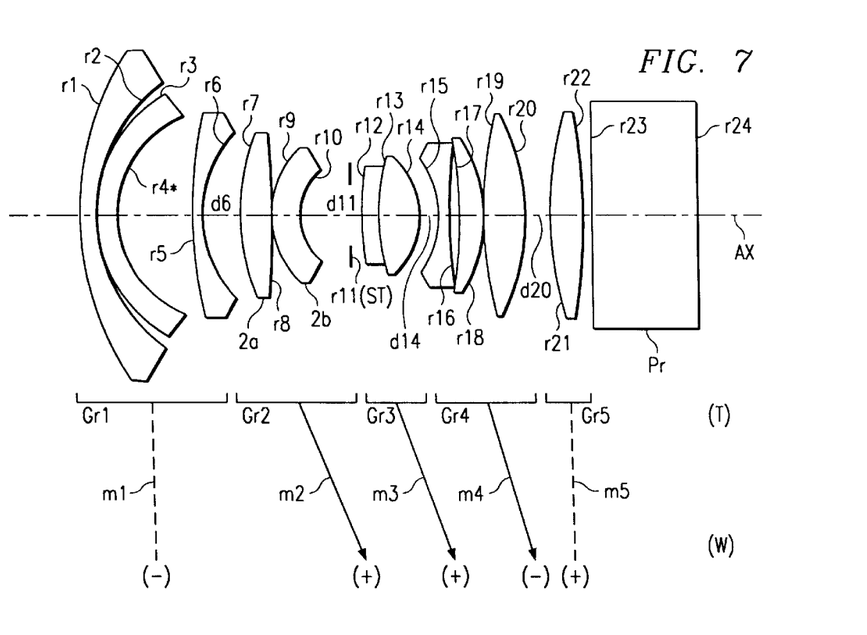
FIG. 7 is a structural view of the lens of a fourth embodiment (example 4)
Figure 8:
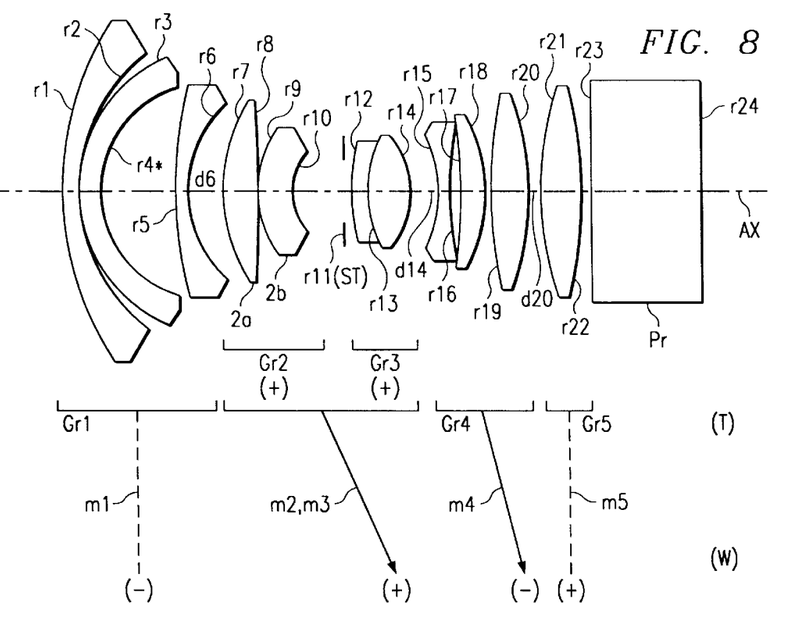
FIG. 8 is a structural view of the lens of a fifth embodiment (example 5)
Figure 9:
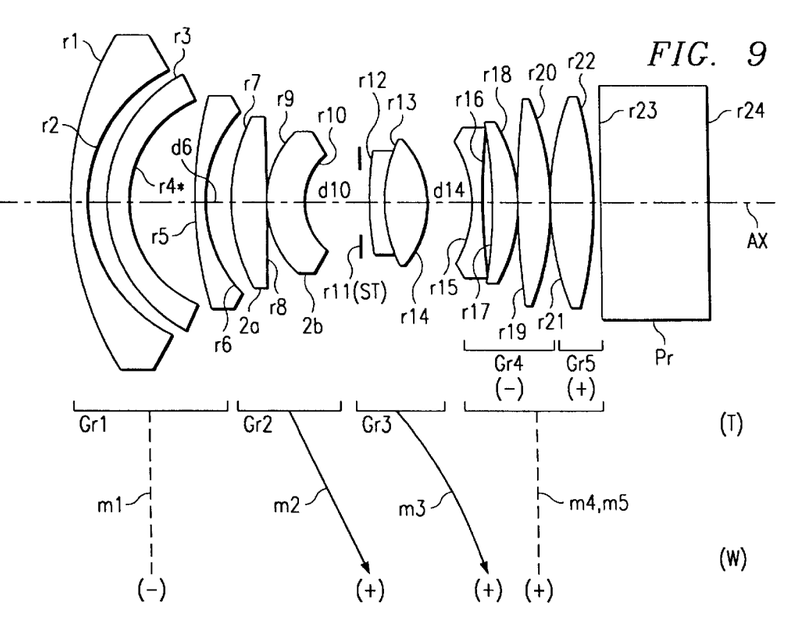
FIG. 9 is a structural view of the lens of a sixth embodiment (example 6)
Figure 10A:
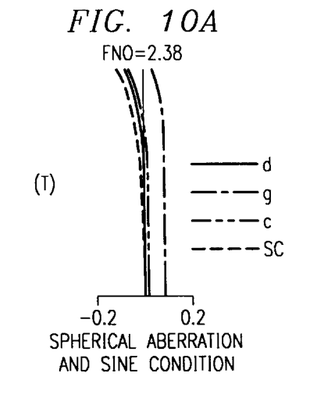
FIGS. 10A–10F are aberration diagrams of the zoom lens system of the fourth embodiment.
Figure 10B:
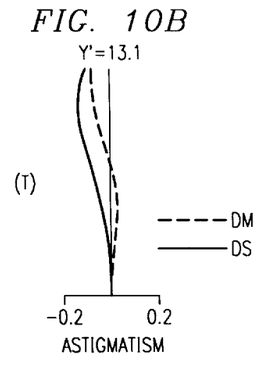
Figure 10C:
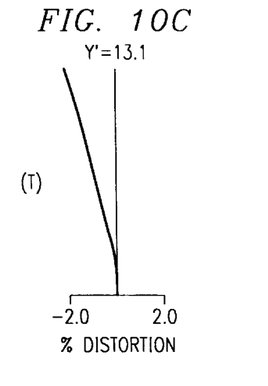
Figure 10D:
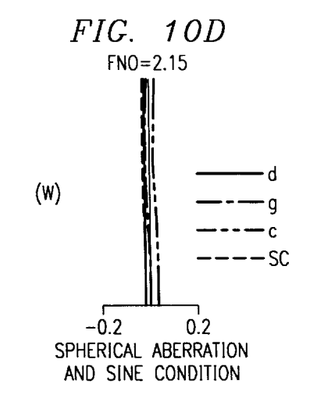
Figure 10E:
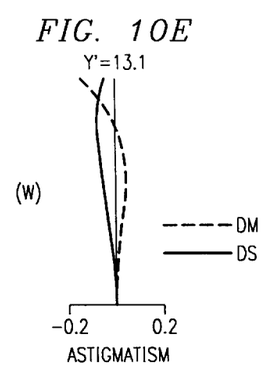
Figure 10F:
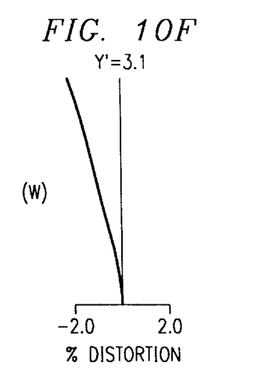
Figure 11A:
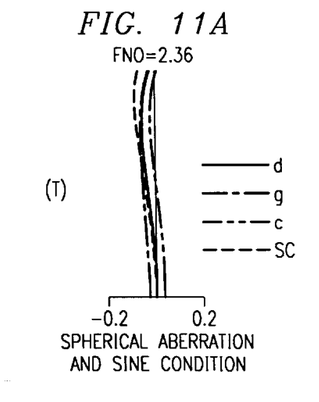
FIGS. 11A–11F are aberration diagrams of the zoom lens system of the fifth embodiment.
Figure 11B:
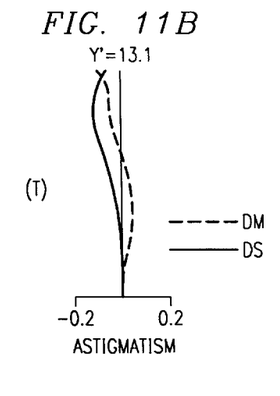
Figure 11C:
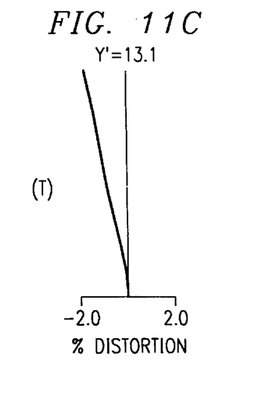
Figures 11D, 12A:
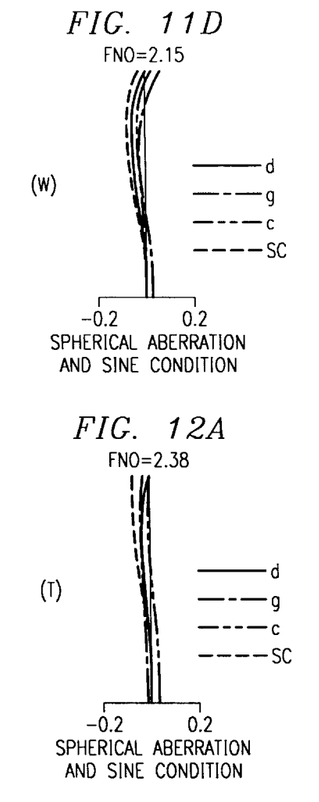
Figure 11E:
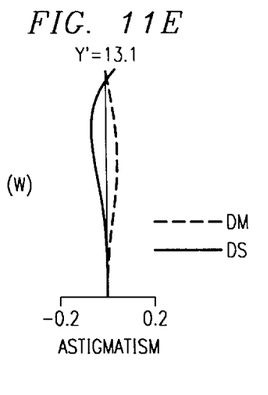
Figure 11F:
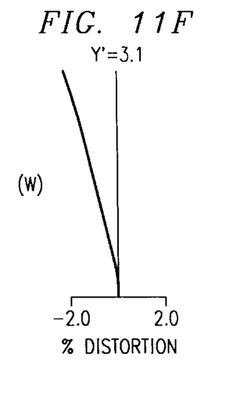
Figure 12B:
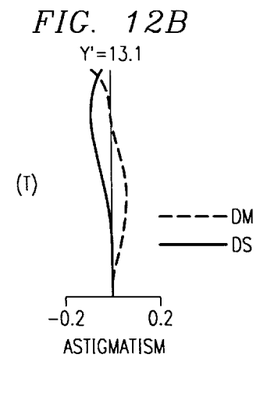
FIG. 12 is an aberration diagram of the sixth embodiment.
Figure 12C:
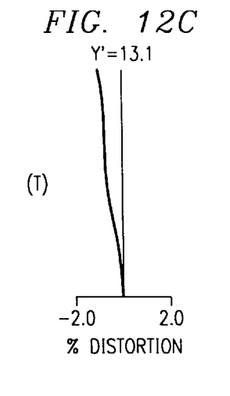
Figure 12D:
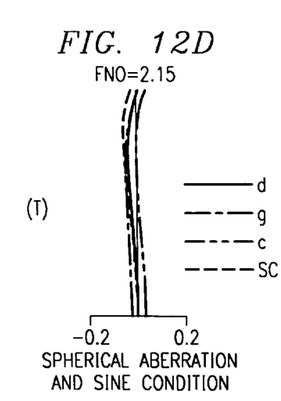
Figure 12E:
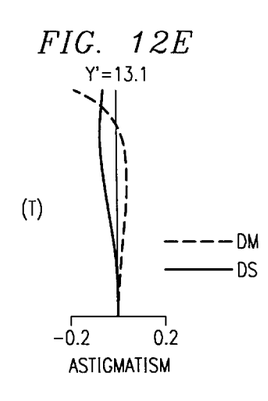
Figure 12F:
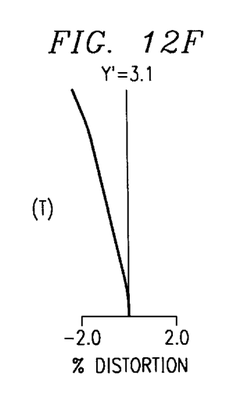

FIGS. 7–9 are lens structural diagrams respectively corresponding to the zoom lenses of the fourth through sixth embodiments, wherein the lens layout is shown in optical section at the telephoto end (T). In each lens structure drawing, the solid arrows mj (j=2, 3, 4) schematically show the movement along the optical axis (AX) of the No. j lens unit (Grj) when zooming from the telephoto end (longest focal length end; T) to the wide angle end (shortest focal length end; W), and the dashed lines mj (j=1, 4, 5) represent a fixed position of the No. j lens unit (Grj) during zooming. In each lens structural drawing, surfaces marked by the symbol ri (i=1, 2, 3, ...) are the No. i surface counting from the enlarging side (i.e., projection side), and surfaces marked by ri with an asterisk symbol (*) are aspherical surfaces. The axial distance marked by the symbol di is a variable distance which changes during zooming among the No. i axial distances di (i=1, 2, 3, ...) counting from the enlarging side.

The fourth through sixth embodiments are projection zoom lenses which are approximately telecentric on the reducing side and comprise, sequentially from the enlarging side, a first lens unit (Gr1) having negative optical power, a second lens unit (Gr2) having positive optical power, a third lens unit (Gr3) having positive optical power, a fourth lens unit (Gr4) having negative optical power, and a fifth lens unit (Gr5) having positive optical power. A diaphragm (ST) is disposed medially to the second lens unit (Gr2) and the third lens unit (Gr3), and on the reducing side of the fifth lens unit (Gr5) is disposed a prism (Pr) equivalent to a cross dichroic prism, flux separation prism or the like. Near the exit surface of the prism (Pr) is disposed a display element (liquid crystal panel or the like) for displaying an image to be projected onto a screen.

In the fourth embodiment (FIG. 7), when zooming from the telephoto end (T) to the wide angle end (W), the second lens unit (Gr2), third lens unit (Gr3), and fourth lens unit (Gr4) move from the enlarging side to the reducing side. During this zooming the diaphragm (ST), disposed medially to the second lens unit (Gr2) and the third lens unit (Gr3), moves together with the second lens unit (Gr2) in the zoom movement; the distance (d6) between the first lens unit (Gr1) is increased; and the distance (d11) between the second lens unit (Gr2) and the third lens unit (Gr3), the distance (d14) between the third lens unit (Gr3) and the fourth lens unit (Gr4), and the distance (d20) between the fourth lens unit (Gr4) and the fifth lens unit (Gr5) are reduced. The first lens unit (Gr1), fifth lens unit (Gr5), and prism (Pr) are stationary during zooming.

In the fifth embodiment (FIG. 8); when zooming from the telephoto end (T) to the wide angle end (W), the second lens unit (Gr2), third lens unit (Gr3), and fourth lens unit (Gr4) move from the enlarging side to the reducing side. During this zooming the diaphragm (ST), disposed medially to the second lens unit (Gr2) and the third lens unit (Gr3), moves together with the second lens unit (Gr2) and the third lens unit (Gr3) in the zoom movement, the distance (d6) between the first lens unit (Gr1) and the second lens unit (Gr2) is increased; and the distance (d14) between the third lens unit (Gr3) and the fourth lens unit (Gr4), and the distance (d20) between the fourth lens unit (Gr4) and the fifth lens unit (Gr5) are reduced. Since the second lens unit (Gr2) and the third lens unit (Gr3) perform the same movement during zooming, this zoom lens is of a type which maintains the negative-positive-positive-negative-positive optical power arrangement, and functions as a four-part negative-positive-negative-positive zoom. Furthermore, the first lens unit (Gr1), fifth lens unit (Gr5), and prism (Pr) are stationary during zooming.

In the sixth embodiment (FIG. 9), when zooming from the telephoto end (T) to the wide angle end (W), the second lens unit (Gr2) and third lens unit (Gr3) move from the enlarging side to the reducing side. During this zooming the diaphragm (ST), disposed medially to the second lens unit (Gr2) and the third lens unit (Gr3), moves together with the third lens unit (Gr3), in the zoom movement; the distance (d6) between the first lens unit (Gr1) and the second lens unit (Gr2) is increased; and the distance (d16) between the third lens unit (Gr3) and the fourth lens unit (Gr4) is reduced. Furthermore, the distance (d10) between the second lens unit (Gr2) and the third lens unit (Gr3) is increased from the telephoto end (T) to the intermediate focal length state, and is reduced from the intermediate focal length state to the wide angle end (W). Since the fourth lens unit (Gr4) does not move during zooming, the first lens unit (Gr1), fourth lens unit (Gr4), fifth lens unit (Gr5), and prism (Pr) are stationary during zooming. Accordingly, this zoom lens is of a type which maintains the negative-positive-positive-negative-positive optical power arrangement, and functions as a four-part negative-positive-positive-positive zoom.

In the fourth and fifth embodiments (FIGS. 7 and 8), each lens unit is constructed, sequentially from the enlarging side, as described below. The first lens unit (Gr1) is a three-part negative meniscus lens having a concave surface facing the reducing side, and the No. 4 surface (r4) counting from the enlarging side is an aspherical surface. The lens unit (Gr2) comprises a biconvex positive lens element (2a), and a negative meniscus lens element (2b) having a convex surface facing the enlarging side. The third lens unit (Gr3) is a cemented lens comprising a negative meniscus lens element having a convex surface facing the enlarging side, and a positive biconvex lens element. The fourth lens unit (Gr4) comprises a biconcave negative lens element, positive meniscus lens element having a convex surface facing the reducing side, and a biconvex positive lens element. The fifth lens unit (Gr5) is a biconvex lens element.

In the sixth embodiment (FIG. 9), each lens unit is constructed, sequentially from the enlarging side, as described below. The first lens unit (Gr1) is a three-part negative meniscus lens having a concave surface facing the reducing side, and the No. 4 surface (r4) counting from the enlarging side is an aspherical surface. The lens unit (Gr2) comprises a positive meniscus lens element (2a) having a convex surface facing the enlarging side, and a negative meniscus lens element (2b) having a convex surface facing the enlarging side. The third lens unit (Gr3) is a cemented lens comprising a negative meniscus lens element having a convex surface facing the enlarging side and a biconvex positive lens element. The fourth lens unit (Gr4) comprises a biconcave negative lens element, positive meniscus lens element having a convex surface facing the reducing side, and a biconvex positive lens element. The fifth lens unit (Gr5) comprises a biconvex positive lens element.

It is desirable from the perspective of aberration correction that the first lens unit (Gr1) has at least one surface that is an aspherical surface, as in the fourth through sixth embodiments. The lens diameter of the first lens unit (Gr1) can be reduced when the first lens unit (Gr1) having negative optical power is stationary during zooming. For example, the mechanical structure of the first lens unit (Gr1) becomes simpler and more compact in the diameter direction even when using a focusing method of extending one lens unit. Accordingly, a zoom lens which is more compact overall in the diameter direction is obtained.

In the fourth through sixth embodiments, the second lens unit (GR2) comprises, sequentially from the enlarging side, a positive lens element (2a) having a convex surface facing the enlarging side, and a negative meniscus lens element (2b) having a convex surface facing the enlarging side. In a lens type having an optical power arrangement of negative-positive-positive-negative-positive, it is desirable that the second lens unit (Gr2) has the structure described above and satisfies conditions (2) and (3) below.

$$3.5 < f2/fw < 7.0 \quad (2)$$

$$0.05 < (r2F - r2R)/(r2F + r2R) < 0.45 \quad (3)$$

where fw represents the focal length of the entire system at the wide angle end, f2 represents the focal length of the second lens unit (Gr2), r2F represents the radius of curvature of the surface on the enlarging side of the negative meniscus lens element (2b) of the second lens unit (Gr2) (r9 in FIGS. 1–3), and r2R represents the radius of curvature of the surface on the reducing side of the negative meniscus lens element (2b) of the second lens unit (Gr2) (r10 in FIGS. 1–3).

When the lower limit of condition (2) is exceeded, the optical power of the second lens unit (Gr2) increases and aberration correction becomes difficult. Conversely, when the upper limit of condition (2) is exceeded, the movement of the second lens unit (Gr2) increases, and the lens is enlarged. Furthermore, when outside the range of condition (3), astigmatic difference increases. Accordingly, curvature of field and astigmatic difference, which become problems at wide angle, can be suitably corrected by satisfying conditions (2) and (3), such that a wide angle type projection zoom lens having excellent optical performance can be realized.

The lens units in each of the previously described embodiments comprise only refractive type lenses which deflect impinging light by refraction (i.e., lenses of a type which deflect at the interface of analogous materials having different refractivity), but are not limited to this arrangement. For example, each lens may be constructed as a diffractive type lens which deflects impinging rays by diffraction, a refractive-diffractive hybrid type lens which deflects impinging rays by a combination diffractive action and refractive action, or refractive index profile type lens which deflects impinging rays by refractive index profile within the medium. Furthermore, it is desirable that at least one surface in the lens unit is an aspherical surface for effective aberration correction, The structure of the projection type zoom lenses of the embodiments of the present invention are specifically described below in terms of construction data. The examples 1–6 below respectively correspond to the previously described first through sixth embodiments, and the lens structural diagrams (FIGS. 1–3, FIGS. 7–9) representing the first through sixth embodiments respectively show the lens structures of the corresponding examples 1–6.

In the construction data of each example, ri (i=1, 2, 3, . . . ) represents the radius of curvature (mm) of the No. i surface counting from the enlarging side, di (i=1, 2, 3, . . . )

represents No. i axial distance (mm) counting from the enlarging side, and Ni (i=1, 2, 3, . . . ) and vi (i=1, 2, 3, . . . ) respectively represent the refractive index (Nd) and Abbe No. (vd) relative to the d-line of the No. i optical element counting from the enlarging side. In the construction data, the axial distance which changes during zooming is a variable air gap at the telephoto end (longest focal length distance; T), middle (intermediate focal length state: M), and wide angle end (shortest focal length end; W). The total system focal length (f, mm) at each focal length state (T), (M), (W), and f-number (FNO), and conditional corresponding values are collectively shown.

Surfaces which have an asterisk (*) symbol attached to the radius of curvature ri represent aspherical surfaces, and are defined by the equation (AS) below which represents the surface shape of the aspherical surface, The aspherical surface data are shown collectively with the other data.

$$X(H)=(C \cdot H^2)/\{1+\sqrt{(1-\epsilon C^2 \cdot H^2)}\}+(A_4 \cdot H^4 + A_6 \cdot H^6 + A_8 \cdot H^8 + A_{10} \cdot H^{10}) \quad (AS)$$

Where X(H) represents the displacement (surface apex standard) in the optical axis (AX) direction at the height H position, H represents the height in a direction perpendicular to the optical axis (AX), C represents paraxial curvature (=1/radius of curvature), and Ai represents the aspheric surface coefficient of the i degree.

FIGS. 4A–4F, 5A–5F, and 6A–6F are aberration diagrams corresponding to the first through third embodiments, respectively, and FIGS. 10A–10F, 11A–11F, and 12A–12F are aberration diagrams corresponding to the fourth through sixth embodiments respectively; (T) shows the various aberrations (sequentially from the left. spherical aberration, astigmatism, distortion; Y' represents the maximum image height (mm)) of a distant object at the reducing side of the telephoto end, and (W) shows the same at the wide angle end. In the spherical aberration diagrams, the solid line (d) represents the spherical aberration relative to the d-line, the single chain line (g) represents spherical aberration relative to the g-line, the double chain line (c) represents spherical aberration relative to the c-line, the broken line (SC) represents the sine condition. In the astigmatism diagrams, the broken line (DM) represents astigmatism relative to the d-line at the meridional surface, and the solid line (DS) represents astigmatism relative to the d-line at the sagittal surface. In the distortion diagrams, the solid line represents the percentage distortion relative the d-line. Although properly speaking, the screen surface (projection surface) is the image plane and the display element surface (e.g., liquid crystal panel surface) is the object plane when using the embodiments as a zoom lens in a projection device (e.g., liquid crystal projector), in these examples the system is specified as a reducing system (e.g., image sensing optical system) from the perspective of optical design, and the optical performance of the display element surface is evaluated using the screen surface as an object plane.

<Example 1 . . . negative-positive-positive-negative-positive> f=17.0(T)~15.8(M)~14.4(W)
FNO=2.33(T)~2.15(W)
conditions(1),(1A) . . . $(f_w/r_{2A})+(f_W/r_{3A})=-0.875$

| [Radius of Curvature] [Axial Distance] | [Refractive Index] | [Abbe Number] |
|---|---|---|
| r1 = 47.816 | | |
| d1 = 3.000 | N1 = 1.51680 | v1 = 64.20 |
| r2 = 26.318 | | |
| d2 = 3.506 | | |
| r3 = 26.303 | | |
| d3 = 4.000 | N2 = 1.52510 | v2 = 56.38 |
| r4* = 16.000 | | |
| d4 = 11.170 | | |
| r5 = 61.770 | | |
| d5 = 2.000 | N3 = 1.51680 | v3 = 64.20 |
| r6 = 17.606 | | |
| d6 = 11.145 ~ 13.408 ~ 16.524 | | |
| r7 = 32.644 | | |
| d7 = 4.928 | N4 = 1.75450 | v4 = 32.83 |
| r8 = −358.887 | | |
| d8 = 6.690 | | |
| r9 = −52.330 | | |
| d9 = 2.348 | N5 = 1.48749 | v5 = 70.44 |
| r10 = −30.758 | | |
| d10 = 5.768 | | |
| r11 = ∞(ST) | | |
| d11 = 3.044 ~ 3.754 ~ 4.213 | | |
| r12 = −24.009 | | |
| d12 = 5.135 | N6 = 1.48749 | □6 = 70.44 |
| r13 = −12.192 | | |
| d13 = 1.849 | N7 = 1.75450 | v7 = 32.83 |
| r14 = −22.541 | | |
| d14 = 0.806 | | |
| r15 = −128.086 | | |
| d15 = 4.356 | N8 = 1.62041 | v8 = 60.34 |
| r16 = −23.085 | | |
| d16 = 7.801 ~ 5.247 ~ 2.587 | | |
| r17 = −20.194 | | |
| d17 = 2.000 | N9 = 1.75520 | v9 = 27.53 |
| r18 = 145.292 | | |
| d18 = 1.030 | | |
| r19 = −197.296 | | |
| d19 = 5.098 | N10 = 1.62041 | v10 = 60.34 |
| r20 = −29.752 | | |
| d20 = 0.300 | | |
| r21 = 97.118 | | |
| d21 = 5.356 | N11 = 1.74400 | v11 = 44.90 |
| r22 = −73.886 | | |
| d22 = 1.634 ~ 1.214 ~ 0.300 | | |
| r23 = 49.476 | | |
| d23 = 5.036 | N12 = 1.62041 | v12 = 60.34 |
| r24 = −192.215 | | |
| d24 = 2.000 | | |
| r25 = ∞ | | |
| d25 = 21.000 | N13 = 1.51680 | v13 = 64.20 |
| r26 = ∞ | | |

[Aspherical Data of 4th Surface (r4)]
□=0.13377,
A4=0.13318×10⁻⁴,A6=−0.22378×10⁻⁷,
A8=0.10542×10⁻⁹,A10=−0.17194×10⁻¹²

<Example 2 . . . negative-positive-negative-positive> f=17.0(T)~15.8(M)~14.4(W)
FNO=2.49(T)~2.32(W)
conditions(1),(1A) . . . $(f_W/r_{2A})+(f^W/r_{3A})=-0.762$

| [Radius of Curvature] [Axial Distance] | [Refractive Index] | [Abbe Number] |
|---|---|---|
| r1 = 42.710 | | |
| d1 = 3.000 | N1 = 1.51680 | v1 = 64.20 |

-continued

| [Radius of Curvature] [Axial Distance] | [Refractive Index] | [Abbe Number] |
|---|---|---|
| r2 = 26.781 | | |
| d2 = 3.506 | | |
| r3 = 26.232 | | |
| d3 = 4.000 | N2 = 1.52510 | v2 = 56.38 |
| r4* = 16.000 | | |
| d4 = 11.957 | | |
| r5 = 71.547 | | |
| d5 = 2.000 | N3 = 1.51680 | v3 = 64.20 |
| r6 = 16.950 | | |
| d6 = 11.646 ~ 14.066 ~ 17.335 | | |
| r7 = 42.045 | | |
| d7 = 5.205 | N4 = 1.71736 | v4 = 29.50 |
| r8 = −118.294 | | |
| d8 = 8.966 | | |
| r9 = −180.832 | | |
| d9 = 2.965 | N5 = 1.48749 | v5 = 70.44 |
| r10 = −26.431 | | |
| d10 = 0.858 | | |
| r11 = ∞(ST) | | |
| d11 = 3.327 | | |
| r12 = −21.103 | | |
| d12 = 5.269 | N6 = 1.48749 | v6 = 70.44 |
| r13 = −11.418 | | |
| d13 = 1.800 | N7 = 1.74400 | v7 = 44.90 |
| r14 = −22.322 | | |
| d14 = 0.438 | | |
| r15 = −86.407 | | |
| d15 = 4.812 | N8 = 1.63854 | v8 = 55.45 |
| r16 = −18.922 | | |
| d16 = 4.203 ~ 3.229 ~ 2.478 | | |
| r17 = −19.055 | | |
| d17 = 2.000 | N9 = 1.80518 | v9 = 25.46 |
| r18 = 105.883 | | |
| d18 = 1.722 | | |
| r19 = −84.943 | | |
| d19 = 4.562 | N10 = 1.62041 | v10 = 60.34 |
| r20 = −28.266 | | |
| d20 = 0.300 | | |
| r21 = 119.352 | | |
| d21 = 5.553 | N11 = 1.74400 | v11 = 44.90 |
| r22 = −54.424 | | |
| d22 = 4.265 ~ 2.818 ~ 0.300 | | |
| r23 = 45.545 | | |
| d23 = 5.355 | N12 = 1.62041 | v12 = 60.34 |
| r24 = ∞ | | |
| d24 = 2.000 | | |
| r25 = ∞ | | |
| d25 = 21.000 | N13 = 1.51680 | v13 = 64.20 |
| r26 = ∞ | | |

[Aspherical Data of 4th Surface (r4)]
□=0.16476,
A4=0.14712×10$^{-4}$, A6=−0.23371×10$^{-7}$,
A8=0.14077×10$^{-9}$, A10=−0.21237×10$^{-12}$ <Example 3 . . . negative-positive-positive-positive> f=17.0(T)~15.8(M)~14.4(W)
FNO=2.36(T)~2.15(W)
conditions(1),(1A) . . . $(f_W/r_{2A})+(f_W/r_{3A})=-0.964$

| [Radius of Curvature] [Axial Distance] | [Refractive Index] | [Abbe Number] |
|---|---|---|
| r1 = 42.039 | | |
| d1 = 3.000 | N1 = 1.51680 | v1 = 64.20 |
| r2 = 26.932 | | |
| d2 = 3.506 | | |

-continued

| [Radius of Curvature] [Axial Distance] | [Refractive Index] | [Abbe Number] |
|---|---|---|
| r3 = 26.305 | | |
| d3 = 4.000 | N2 = 1.52510 | v2 = 56.38 |
| r4* = 16.000 | | |
| d4 = 12.439 | | |
| r5 = 74.167 | | |
| d5 = 2.500 | N3 = 1.51680 | v3 = 64.20 |
| r6 = 16.595 | | |
| d6 = 8.074 ~ 10.147 ~ 12.996 | | |
| r7 = 41.038 | | |
| d7 = 5.595 | N4 = 1.71736 | v4 = 29.50 |
| r8 = −103.291 | | |
| d8 = 6.792 | | |
| r9 = −33.226 | | |
| d9 = 2.467 | N5 = 1.48749 | v5 = 70.44 |
| r10 = −23.567 | | |
| d10 = 4.333 ~ 4.904 ~ 5.133 | | |
| r11 = ∞(ST) | | |
| d11 = 3.636 | | |
| r12 = −27.119 | | |
| d12 = 5.659 | N6 = 1.48749 | v6 = 70.44 |
| r13 = −11.369 | | |
| d13 = 1.800 | N7 = 1.74400 | v7 = 44.90 |
| r14 = −22.870 | | |
| d14 = 0.300 | | |
| r15 = −113.106 | | |
| d15 = 4.605 | N8 = 1.63854 | v8 = 55.45 |
| r16 = −21.455 | | |
| d16 = 8.070 ~ 5.426 ~ 2.348 | | |
| r17 = −23.121 | | |
| d17 = 2.000 | N9 = 1.80518 | v9 = 25.46 |
| r18 = 90.453 | | |
| d18 = 1.325 | | |
| r19 = −234.750 | | |
| d19 = 5.300 | N10 = 1.62041 | v10 = 60.34 |
| r20 = −28.704 | | |
| d20 = 0.300 | | |
| r21 = 60.865 | | |
| d21 = 6.041 | N11 = 1.74400 | v11 = 44.90 |
| r22 = −80.245 | | |
| d22 = 0.300 | | |
| r23 = 61.671 | | |
| d23 = 4.348 | N12 = 1.62041 | v12 = 60.34 |
| r24 = ∞ | | |
| d24 = 2.000 | | |
| r25 = ∞ | | |
| d25 = 21.000 | N13 = 1.51680 | v13 = 64.20 |
| r26 = ∞ | | |

[Aspherical Data of 4th Surface (r4)]
□=0.48050,
A4=0.52576×10$^{-5}$, A6=−0.37872×10$^{-7}$,
A8=0.13880×10$^{-9}$, A10=−0.26980×10$^{-12}$ <Example 4 . . . negative-positive-positive-negative-positive> f=17.0(T)~15.8(M)~14.4(W)
FNO=2.33(T)~2.15(W)
Conditions(2) . . . $f_2-f_W=5.07$
Conditions(3) . . . $(r_{2F}-r_{2R})(r_{2F}-r_{2R})=0.235$

| [Radius of Curvature] [Axial Distance] | [Refractive Index] | [Abbe Number] |
|---|---|---|
| r1 = 56.664 | | |
| d1 = 3.000 | N1 = 1.51680 | v1 = 64.20 |
| r2 = 30.851 | | |
| d2 = 0.300 | | |

-continued

| [Radius of Curvature] [Axial Distance] | [Refractive Index] | [Abbe Number] |
|---|---|---|
| r3 = 26.630 | | |
| d3 = 4.000 | N2 = 1.52510 | v2 = 56.38 |
| r4* = 17.000 | | |
| d4 = 14.284 | | |
| r5 = 76.538 | | |
| d5 = 2.000 | N3 = 1.51680 | v3 = 64.20 |
| r6 = 22.445 | | |
| d6 = 7.303 ~ 10.223 ~ 14.350 | | |
| r7 = 35.146 | | |
| d7 = 6.267 | N4 = 1.75520 | v4 = 27.53 |
| r8 = −369.248 | | |
| d8 = 0.300 | | |
| r9 = 17.179 | | |
| d9 = 5.241 | N5 = 1.62041 | v5 = 60.34 |
| r10 = 10.643 | | |
| d10 = 10.108 | | |
| r11 = ∞(ST) | | |
| d11 = 2.100 ~ 1.900 ~ 1.528 | | |
| r12 = 55.621 | | |
| d12 = 3.267 | N6 = 1.75520 | v6 = 27.53 |
| r13 = 31.128 | | |
| d13 = 8.000 | N7 = 1.51680 | v7 = 64.20 |
| r14 = −15.521 | | |
| d14 = 3.979 ~ 2.789 ~ 2.063 | | |
| r15 = −18.828 | | |
| d15 = 2.000 | N8 = 1.75520 | v8 = 27.53 |
| r16 = 58.974 | | |
| d16 = 1.911 | | |
| r17 = −112.156 | | |
| d17 = 4.795 | N9 = 1.62041 | v9 = 60.34 |
| r18 = −27.276 | | |
| d18 = 0.300 | | |
| r19 = 72.945 | | |
| d19 = 7.678 | N10 = 1.62041 | v10 = 60.34 |
| r20 = −43.850 | | |
| d20 = 4.859 ~ 3.328 ~ 0.300 | | |
| r21 = 63.631 | | |
| d21 = 6.307 | N11 = 1.71700 | v11 = 47.98 |
| r22 = −122.093 | | |
| d22 = 2.000 | | |
| r23 = ∞ | | |
| d23 = 21.000 | N12 = 1.51680 | v12 = 64.20 |
| r24 = ∞ | | |

[Aspherical Data of 4th Surface (r4)]
□=0.55170,
A4=0.21508×10$^{-5}$, A6=−0.81513×10$^{-8}$,
A8=0.20719×10$^{-10}$, A10=−0.23444×10$^{-13}$ <Example 5 . . . negative-positive-negative-positive> f=17.0(T)~15.8(M)~14.4(W)
FNO=2.36(T)~2.15(W)
Conditions(2) . . . $f_2 \cdot f_W$=5.88
Conditions(3) . . . $(r_{2F} \sim r_{2R})(r_{2F} \sim r_{2R})$=0.31

| [Aspherical data of 4th surface (r4)] | | |
|---|---|---|
| r1 = 55.374 | | |
| d1 = 3.000 | N1 = 1.51680 | v1 = 64.20 |
| r2 = 30.942 | | |
| d2 = 0.300 | | |
| r3 = 26.713 | | |
| d3 = 4.000 | N2 = 1.52510 | v2 = 56.38 |
| r4* = 17.000 | | |
| d4 = 14.311 | | |
| r5 = 74.182 | | |
| d5 = 2.000 | N3 = 1.51680 | v3 = 64.20 |
| r6 = 21.581 | | |
| d6 = 6.790 ~ 9.287 ~ 12.702 | | |
| r7 = 30.234 | | |
| d7 = 6.280 | N4 = 1.75520 | v4 = 27.53 |
| r8 = −1479.115 | | |
| d8 = 0.300 | | |
| r9 = 19.976 | | |
| d9 = 6.270 | N5 = 1.62041 | v5 = 60.34 |
| r10 = 10.521 | | |
| d10 = 10.236 | | |
| r11 = ∞(ST) | | |
| d11 = 1.365 | | |
| r12 = 41.66 | | |
| d12 = 3.000 | N6 = 1.75520 | v6 = 27.53 |
| r13 = 22.664 | | |
| d13 = 7.954 | N7 = 1.51680 | v7 = 64.20 |
| r14 = −15.965 | | |
| d14 = 5.520 ~ 3.505 ~ 1.641 | | |
| r15 = −23.144 | | |
| d15 = 2.000 | N8 = 1.75520 | v8 = 27.53 |
| r16 = 49.157 | | |
| d16 = 2.101 | | |
| r17 = −122.961 | | |
| d17 = 4.639 | N9 = 1.62041 | v9 = 60.34 |
| r18 = −28.986 | | |
| d18 = 1.011 | | |
| r19 = 78.746 | | |
| d19 = 6.936 | N10 = 1.62041 | v10 = 60.34 |
| r20 = −56.380 | | |
| d20 = 2.333 ~ 1.852 ~ 0.300 | | |
| r21 = 60.759 | | |
| d21 = 7.653 | N11 = 1.71700 | v11 = 47.98 |
| r22 = −82.634 | | |
| d22 = 2.000 | | |
| r23 = ∞ | | |
| d23 = 21.000 | N12 = 1.51680 | v12 = 64.20 |
| r24 = ∞ | | |

[Aspherical Data of 4th Surface (r4)]
□=0.54329,
A4=0.24115×10$^{-5}$, A6=−0.79813×10$^{-8}$,
A8=0.22204×10$^{-10}$, A10=−0.24829×10$^{-13}$ <Example 6 . . . negative-positive-positive-negative-positive> f=17.0(T)~15.8(M)~14.4(W)
FNO=2.36(T)~2.15(W)
Conditions(2) . . . $f_2 \cdot f_W$=4.643
Conditions(3) . . . $(r_{2F} \sim r_{2R})(r_{2F} \sim r_{2R})$=0.266

| [Aspherical data of 4th surface (r4)] | | |
|---|---|---|
| r1 = 57.432 | | |
| d1 = 3.000 | N1 = 1.51680 | v1 = 64.20 |
| r2 = 26.599 | | |
| d2 = 3.918 | | |
| r3 = 26.880 | | |
| d3 = 4.000 | N2 = 1.52510 | v2 = 56.38 |
| r4* = 17.000 | | |
| d4 = 12.385 | | |
| r5 = 62.713 | | |
| d5 = 2.000 | N3 = 1.51680 | v3 = 64.20 |
| r6 = 23.365 | | |
| d6 = 5.007 ~ 6.987 ~ 10.680 | | |
| r7 = 30.942 | | |
| d7 = 6.727 | N4 = 1.75520 | v4 = 27.53 |
| r8 = 2403.095 | | |
| d8 = 0.300 | | |

-continued

[Aspherical data of 4th surface (r4)]

r9 = 17.895
    d9 = 6.566    N5 = 1.62041    v5 = 60.34
r10 = 10.383
    d10 = 10.868 ~ 11.332 ~ 10.864
r11 = ∞(ST)
    d11 = 1.586
r12 = 46.264
    d12 = 3.000    N6 = 1.75520    v6 = 27.53
r13 = 22.335
    d13 = 8.000    N7 = 1.51680    v7 = 64.20
r14 = −16.372
    d14 = 7.417 ~ 4.973 ~ 1.748
r15 = −23.150
    d15 = 2.000    N8 = 1.75520    v8 = 27.53
r16 = 59.938
    d16 = 2.252
r17 = −89.916
    d17 = 4.479    N9 = 1.62041    v9 = 60.34
r18 = −28.430
    d18 = 0.300
r19 = 119.510
    d19 = 5.945    N10 = 1.62041    v10 = 60.34
r20 = −54.023
    d20 = 0.300
r21 = 52.896
    d21 = 7.932    N11 = 1.71700    v11 = 47.98
r22 = −75.484
    d22 = 2.000
r23 ∞
    d23 = 21.000    N12 = 1.51680    v12 = 64.20
r24 = ∞

[Aspherical Data of 4th Surface (r4)]
□=0.35355,
$A4 = 0.52672 \times 10^{-5}, A6 = -0.17983 \times 10^{-7},$
$A8 = 0.59083 \times 10^{-10}, A10 = -0.83580 \times 10^{-13}$ The present invention described above realizes a projection zoom lens of a wide angle type (e.g., half field angle of 35° or greater) having excellent optical performance. when the projection zoom lens of the present invention is used in a projection device such as a liquid crystal projector or the like, a larger display image can be projected at a shorter projection distance than is conventionally possible.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens system comprising, sequentially from the enlarging side to the reducing side:
    a first lens unit having negative optical power;
    a second lens unit having positive optical power, the second lens unit having a positive lens element positioned nearest the reducing side;
    a diaphragm;
    a third lens unit having positive optical power; the third lens unit comprising, sequentially from the enlarging side to reducing side, a cemented lens unit having a positive lens element and a negative lens element with a concave surface facing the reducing side, and a positive lens element having a concave surface facing the reducing side;
    a fourth lens unit having negative optical power; and
    a fifth lens unit having positive optical power;
    wherein the second lens unit, the third lens unit, and the fourth lens unit move from the enlarging side to the reducing side when zooming from the telephoto end to the wide angle end, and
    wherein the zoom lens system satisfies the condition below:

$-1.5 < (fw/r2A) + (fw/r3A) < -0.05$ where fw represents the focal length of the entire system at the wide angle end, r2A represents the radius of curvature of the surface on the enlarging side of the lens element positioned nearest the reducing side of the second lens unit, and r3A represents the radius of curvature of the surface nearest the enlarging side of the third lens unit.

2. A zoom lens system as claimed in claim 1, further comprising:
    a prism provided at the most reduction side of the zoom lens system.

3. A zoom lens system as claimed in claim 1, wherein the first lens unit and the fifth lens unit are stationary when zooming from the telephoto end to the wide angle end.

4. A zoom lens system comprising, sequentially from the enlarging side to the reducing side:
    a first lens unit having negative optical power;
    a second lens unit having positive optical power, the second lens unit having a positive lens element positioned nearest the reducing side;
    a diaphragm;
    a third lens unit having positive optical power, the third lens unit comprising, sequentially from the enlarging side to reducing side, a cemented lens unit having a positive lens element and a negative lens element with a concave surface facing the reducing side, and a positive lens unit having a concave surface facing the reducing side;
    a fourth lens unit having negative optical power; and
    a fifth lens unit having positive optical power;
    wherein the second lens unit and the third lens unit, move from the enlarging side to the reducing side when zooming from the telephoto end to the wide angle end, and the fourth lens unit does not move during zooming, 
    wherein the zoom lens system satisfies the condition below:

$-1.5 < (fw/r2A) + (fw/r3A) < -0.05$ where fw represents the focal length of the entire system at the wide angle end, r2A represents the radius of curvature of the surface on the enlarging side of the lens element positioned nearest the reducing side of the second lens unit, and r3A represents the radius of curvature of the surface nearest the enlarging side of the third lens unit.

5. A zoom lens system as claimed in claim 4, further comprising:
    a prism provided at the most reduction side of the zoom lens system.

6. A zoom lens system as claimed in claim 4, wherein the first lens unit and the fifth lens unit are stationary when zooming from the telephoto end to the wide angle end.

7. A zoom lens system comprising, sequentially from the enlarging side to reducing side:
    a first lens unit having negative optical power;
    a second lens unit having positive optical power, the second lens unit comprising, sequentially from the enlarging side to the reducing side, a positive lens element having a concave surface facing the enlarging side, and a negative meniscus lens element having a concave surface facing the enlarging side;

a third lens unit having positive optical power;

a fourth lens unit having negative optical power; and a fifth lens unit having positive optical power;

wherein the second lens unit, third lens unit, and fourth lens unit move from the enlarging side to the reducing side when zooming from the telephoto end to the wide angle end, and wherein the zoom lens system satisfies the conditions below:

$$3.5 < f2/fw < 7.0$$

$$0.05 < (r2F - r2R)/(r2F + r2R) < 0.45$$

where fw represents the focal length of the entire system at the wide angle end, f2 represents the focal length of the second lens unit, r2F represents the radius of curvature of the surface on the enlarging side of the negative meniscus lens element of the second lens unit, and r2R represents the radius of curvature of the surface on the reducing side of the negative meniscus lens element of the second lens unit.

8. A zoom lens system as claimed in claim 7, further comprising:

a prism provided at the most reduction side of the zoom lens system.

9. A zoom lens system as claimed in claim 7, wherein the first lens unit and the fifth lens unit are stationary when zooming from the telephoto end to the wide angle end.

10. A zoom lens system comprising, sequentially from the enlarging side to the reducing side, a first lens unit having negative optical power;

a second lens unit having positive optical power, the second lens unit comprising, sequentially from the enlarging side to the reducing side, a positive lens element having a concave surface facing the enlarging side, and a negative meniscus lens element having a concave surface facing the enlarging side;

a third lens unit having positive optical power;

a fourth lens unit having negative optical power; and a fifth lens unit having positive optical power;

wherein the second lens unit and third lens unit move from the enlarging side to the reducing side when zooming from the telephoto end to the wide angle end, and the fourth lens unit does not move during zooming, wherein the zoom lens system satisfies the conditions below:

$$3.5 < f2/fw < 7.0$$

$$0.05 < (r2F - r2R)/(r2F + r2R) < 0.45$$

where fw represents the focal length of the entire system at the wide angle end, f2 represents the focal length of the second lens unit, r2F represents the radius of curvature of the surface on the enlarging side of the negative meniscus lens element of the second lens unit, and r2R represents the radius of curvature of the surface on the reducing side of the negative meniscus lens element of the second lens unit.

11. A zoom lens system as claimed in claim 10, further comprising:

a prism provided at the most reduction side of the zoom lens system.

12. A zoom lens system as claimed in claim 1, wherein the first lens unit and the fifth lens unit are stationary when zooming from the telephoto end to the wide angle end.

* * * * *